(12) United States Patent
Moyer et al.

(10) Patent No.: US 8,307,196 B2
(45) Date of Patent: Nov. 6, 2012

(54) DATA PROCESSING SYSTEM HAVING BIT EXACT INSTRUCTIONS AND METHODS THEREFOR

(75) Inventors: William C. Moyer, Dripping Springs, TX (US); Imran Ahmed, Austin, TX (US); Dan Tamir, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1529 days.

(21) Appl. No.: 11/278,725

(22) Filed: Apr. 5, 2006

(65) Prior Publication Data
US 2007/0239968 A1  Oct. 11, 2007

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................. 712/221
(58) Field of Classification Search ............... 712/7, 10, 712/16, 22, 221, 222
See application file for complete search history.

(56) References Cited

U.S. PATENT DOCUMENTS

| | | | |
|---|---|---|---|
| 5,598,362 A | 1/1997 | Adelman et al. | |
| 5,666,300 A | 9/1997 | Adelman et al. | |
| 5,721,892 A * | 2/1998 | Peleg et al. | 712/221 |
| 5,778,241 A * | 7/1998 | Bindloss et al. | 712/20 |
| 5,889,689 A | 3/1999 | Alidina et al. | |
| 6,058,465 A * | 5/2000 | Nguyen | 712/7 |
| 6,209,012 B1 | 3/2001 | Baudendistel | |
| 6,446,193 B1 * | 9/2002 | Alidina et al. | 712/35 |
| 6,573,846 B1 * | 6/2003 | Trivedi et al. | 341/67 |
| 7,120,661 B2 | 10/2006 | Halahmi et al. | |
| 2002/0026569 A1 * | 2/2002 | Liao et al. | 712/4 |

OTHER PUBLICATIONS

Constantinides, Cheung & Luk; Synthesis of Saturation Arithmetic Architectures; 2003; ACM Press; Transactions on Automation of Electronic Systems; pp. 334-354.*

* cited by examiner

*Primary Examiner* — Corey S Faherty (57) ABSTRACT

A method for operating a data processing system is provided. The method includes providing a first operand stored in a first register, providing a second operand stored in the register, providing a third operand stored in the register. The method further includes executing a first instruction, where executing the first instruction comprises: (1) retrieving the first operand, the second operand, and the third operand from the first register; (2) performing an operation using the first operand, the second operand, and the third operand to generate a bit exact result.

3 Claims, 5 Drawing Sheets

DATA PROCESSING SYSTEM HAVING BIT EXACT INSTRUCTIONS AND METHODS THEREFOR

BACKGROUND OF THE INVENTION

1. Field of the Invention

This invention relates in general to data processing and more specifically to a data processing system having bit exact instructions and methods therefor.

2. Description of the Related Art

Many data processing applications require bit exactness. In general, bit exactness implies a non-associative set of otherwise associative operations, such as multiplication and summation. Traditionally, bit exact data processing has been handled using sequential operations performed by single instructions. For example, in order to process three inputs in a bit exact manner, typically the intermediate result of first two operands is saturated and the saturated intermediate result is then added with the third operand. This sequential execution of producing a saturated intermediate result and then summing the saturated intermediate result with the third operand results in slower execution of bit exact processing.

Thus, there is a need for a data processing system having bit exactness and methods therefor.

BRIEF DESCRIPTION OF THE DRAWINGS

The present invention may be better understood, and its numerous objects, features, and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The following sets forth a detailed description of a mode for carrying out the invention. The description is intended to be illustrative of the invention and should not be taken to be limiting.

Using embodiments of the present invention, vector operations, such as a multiplication operation, a dot product operation, a summation operation, and/or a vector sum across operation may be performed. By way of example, single instruction multiple data (SIMD) instructions may operate on multiple operands in a register and produce bit exact results. By way of example, operands in a SIMD are referred to herein as "packed data elements." The SIMD instructions may perform intermediate saturations to ensure that bit exactness is maintained. Using a SIMD instruction to perform some of the operations on packed data elements in parallel and some of the other operations in a pipelined fashion improves the data processing speed.

In one aspect, a method for operating a data processing system is provided. The method includes providing a first operand stored in a first register, providing a second operand stored in the register, providing a third operand stored in the register. The method further includes executing a first instruction, where executing the first instruction comprises: (1) retrieving the first operand, the second operand, and the third operand from the first register; (2) performing an operation using the first operand, the second operand, and the third operand to generate a bit exact result.

In another aspect, a data processing system is provided. The data processing system includes instruction pipe circuitry comprising a first pipe portion for storing a first instruction and a second pipe portion for storing a second instruction. The data processing system further includes an accumulator having a first accumulator portion and a second accumulator portion, wherein the first accumulator portion and the second accumulator portion are non-overlapping, where execution of the first instruction uses the first accumulator portion and not the second accumulator portion, where execution of the second instruction uses the second accumulator portion and not the first accumulator portion, and where use of the first accumulator portion by the first instruction overlaps in time use of the second accumulator portion by the second instruction.

In yet another aspect, a method for operating a data processing system is provided. The method includes executing an instruction to perform a vector dot product. Executing the instruction to perform a vector dot product may include retrieving a first portion of a first vector and a second portion of the first vector from a first register. Executing the instruction to perform the vector dot product may further include retrieving a first portion of a second vector and a second portion of the second vector from a second register. Executing the instruction to perform the vector dot product may further include multiplying the first portion of the first vector and the first portion of the second vector to produce a first intermediate product. Executing the instruction to perform the vector dot product may further include multiplying the second portion of the first vector and the second portion of the second vector to produce a second intermediate product. Executing the instruction to perform the vector dot product may further include if the first intermediate product overflowed or underflowed, saturating the first intermediate product. Executing the instruction to perform the vector dot product may further include if the second intermediate product overflowed or underflowed, saturating the second intermediate product. Executing the instruction to perform the vector dot product may further include selecting an operation to perform. Executing the instruction to perform the vector dot product may further include performing the operation using the first intermediate product and the second intermediate product to produce a result, wherein the result is a bit exact result. Executing the instruction to perform the vector dot product may further include designating, in the instruction, a portion of a destination register, wherein the portion of the destination register is less than all of the destination register. Executing the instruction to perform the vector dot product may further include storing the bit exact result in the portion of the destination register so that a remainder of the destination register is not used for storing the bit exact result.

Figure 1:
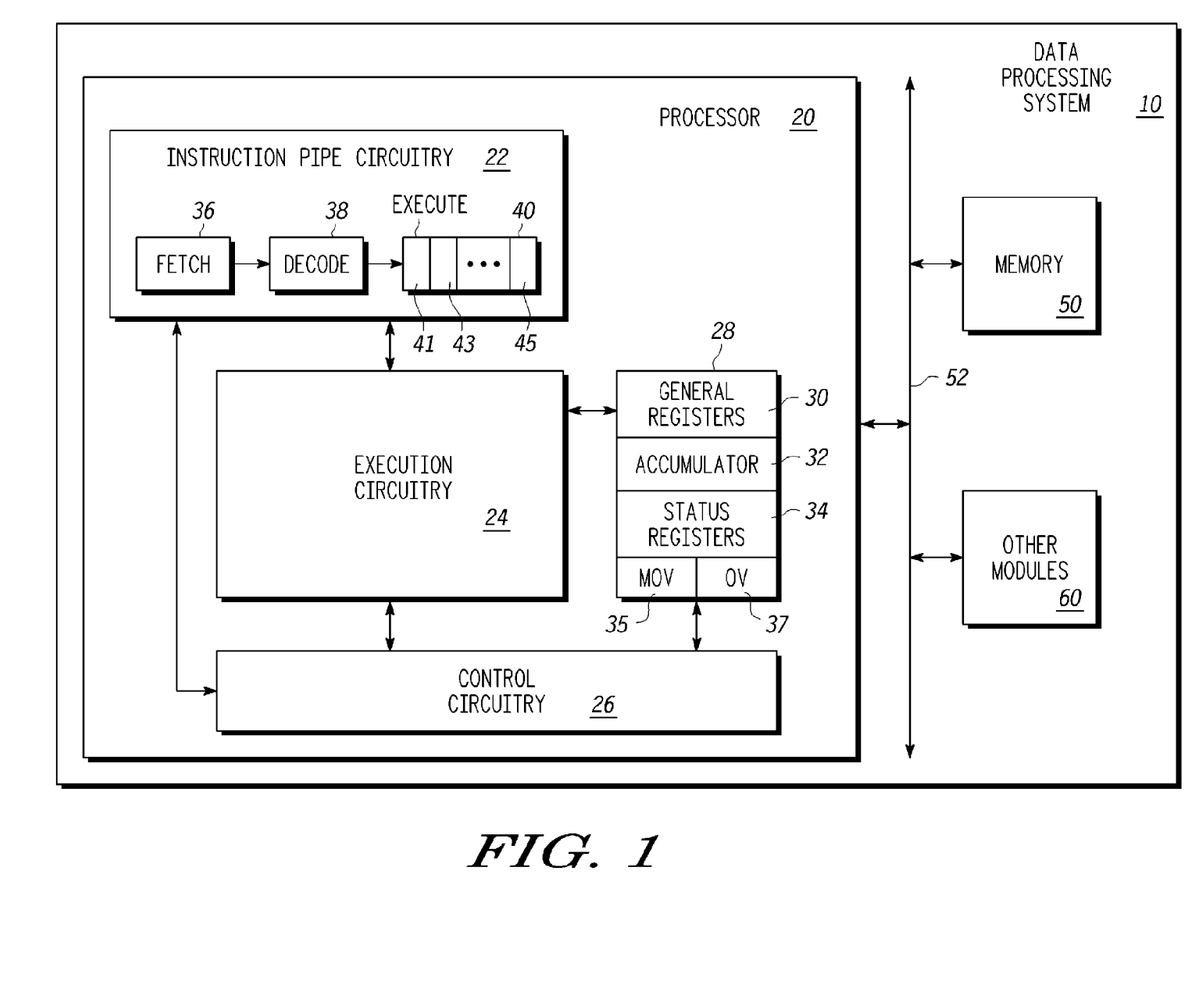
FIG. 1 is a schematic diagram of a data processing system, consistent with one embodiment of the invention.

FIG. 1 is a schematic diagram of an exemplary data processing system, consistent with one embodiment of the invention. Data processing system 10 may include a processor 20, a memory 50, and other modules 60. Thus, for example, although not shown, data processing system may include additional modules, such as communication modules. Processor 20, memory 50, and other modules 60 may be coupled via a bus 52. By way of example, processor 20 may fetch instructions stored in memory 50 and execute them. By way of example, processor 20 may include an instruction pipe circuitry 22, an execution circuitry 24, a control circuitry 26, and a set of registers 28. Execution circuitry 24 may execute instructions under the control of control circuitry 26. Instructions may be fetched from memory 50 and loaded into set of registers 28. Instruction pipe circuitry 22 may be used by execution circuitry 24 to pipeline the execution of certain instructions. Instruction pipe circuitry 22 may include a fetch unit 36, a decode unit 38, and an execute unit 40. Execute unit 40 may execute instructions in a pipe-lined fashion. Thus, for example, pipe-line portions 41, 43, and 45 may be used to execute instructions in a pipelined fashion. Set of registers 28 may include general registers 30, accumulator 32, and status registers 34. Status register 34 may include status information, including flags, such as MOV 35 flag and OV 37 flag. MOV 35 flag may be set if a multiply operation overflows or underflows. OV 37 flag may be set if a summation operation overflows or underflows. Although FIG. 1 shows specific components of processor 20, processor 20 may include additional or fewer components. In addition, although FIG. 1 shows separate components, such as instruction pipe circuitry 22, execution circuitry 24, and control circuitry 26, functionality corresponding to these components may be combined or distributed in other manners. By way of non-limiting example, processor 20 may be a Power PC processor. Additionally, by way of example, registers described herein may be part of a programmer's model for a processor. Programmer's model may refer to an abstract set of instructions available to the programmer.

Figure 2:
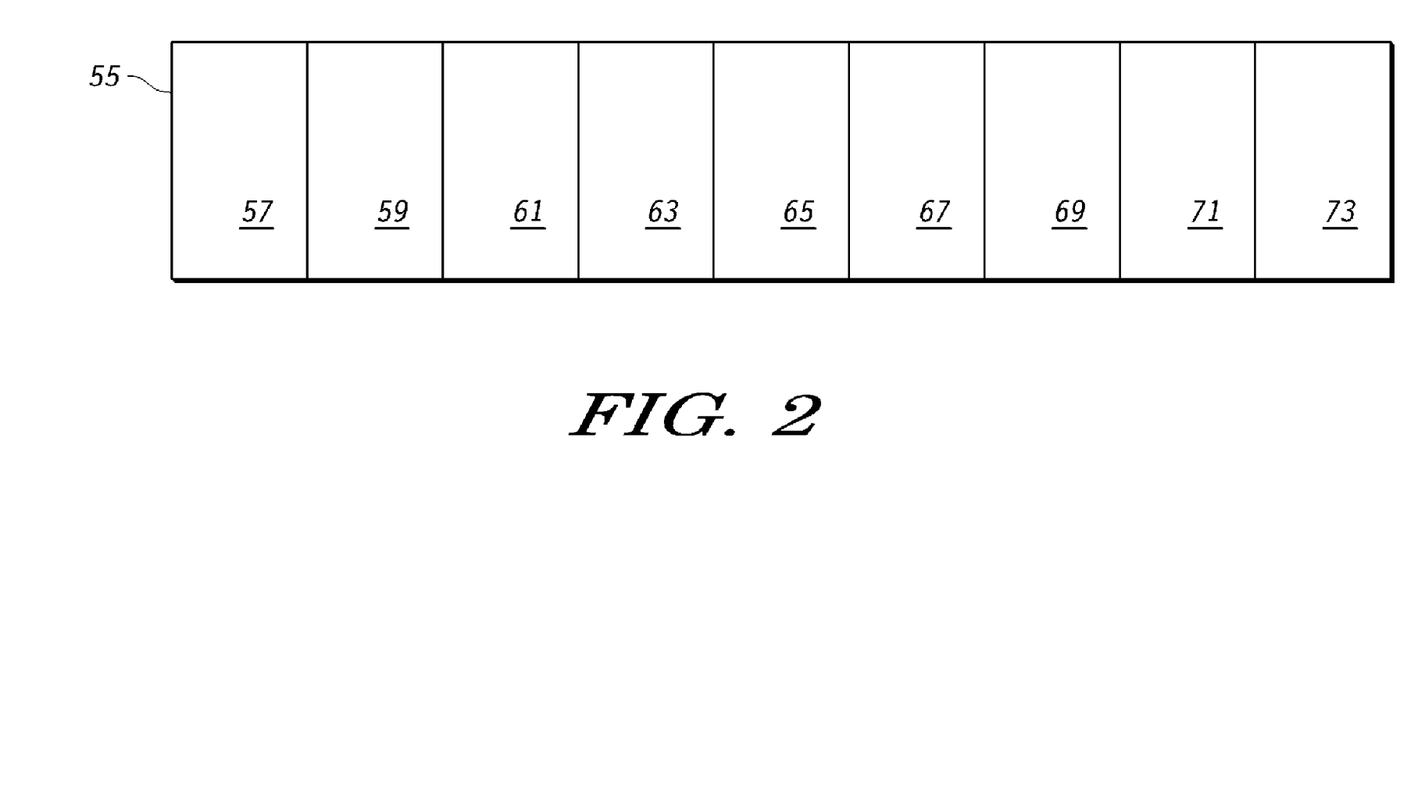
FIG. 2 shows an exemplary SIMD instruction stored in a register, consistent with one embodiment of the invention.

FIG. 2 shows an exemplary SIMD instruction stored in a register, consistent with one embodiment of the invention. SIMD instruction stored in register 55 may be executed by execution circuitry 24 once it is fetched, decoded, and placed into the execute pipeline. By way of example, a SIMD instruction stored in register 55 may perform a vector product or a vector sum operation. Further, by way of example, the SIMD instruction stored in register 55 may have several portions, each of which could relate to a particular aspect of the instruction. For example, a first portion 57 may store a bit or bits corresponding to the operation type, such as whether the operation is a vector multiplication operation, a vector dot product operation, a vector summation operation, or a vector across sum operation. A second portion 59 of the SIMD instruction may select an operation width used in the operation. Operation width may be half-word, one word, or some other width. A third portion 61 of the SIMD instruction may select one of a summation or a subtraction operation. A fourth portion 63 of the SIMD instruction may provide whether the operation is a signed operation or an unsigned operation. A fifth portion 65 of the SIMD instruction may provide whether the operation needs to be saturated or not. For example, whether a multiplication or a sum operation needs saturation or not. A sixth portion 67 of the SIMD instruction may select whether the operation would be a fractional or an integer operation. A seventh portion 69 of the SIMD instruction may select whether an upper portion of a destination register or a lower portion of the destination register is used for storing a bit exact result of the operation. An eighth portion 71 of the SIMD instruction may provide a width of the bit exact result to be stored in the destination register. A ninth portion 73 of the SIMD instruction may provide whether the bit exact result is stored in an accumulator as well as in a destination register. Additionally, if ninth portion 73 of the instruction selects that the bit exact result is to be stored in an accumulator, as well as in the destination register, then seventh portion 69 of the instruction may also select one or more of an upper portion or the lower portion of the accumulator for storing the bit exact result of the vector operation. Each of the portions of the SIMD instruction stored in register 55 may be a single bit or multiple bits. Although FIG. 2 describes a specific format for the SIMD instruction for generating a bit exact result, the SIMD instruction may have a different format. For example, the SIMD instruction may have the various portions of the instruction organized in a different order. Additionally and/or alternatively, the SIMD instruction may have additional or fewer portions.

EXAMPLE 1

By way of example, a vector dot product of four packed data elements (signed or unsigned, fractional or integer) may be stored into an upper word of accumulator 32 of FIG. 1 using an exemplary instruction. The following exemplary pseudo-code may be used to generate the vector dot product in a bit exact manner, where, rD is a destination register, rA is one of the general registers containing one input, and rB is another one of the general registers containing a second input:

---

$temp0_{0:31} \leftarrow rA_{0:15} \times_{sf} rB_{0:15}$
    if $(rA_{0:15} = 0x8000)$ & $(rB_{0:15} = 0x8000)$ then
        $temp0_{0:31} \leftarrow 0x7FFF\_FFFF$ //saturate
        mov $\leftarrow 1$
    else
        mov $\leftarrow 0$
$temp1_{0:31} \leftarrow rA_{16:31} \times_{sf} rB_{16:31}$
    if $(rA_{16:31} = 0x8000)$ & $(rB_{16:31} = 0x8000)$ then
        $temp1_{0:31} \leftarrow 0x7FFF\_FFFF$ //saturate
        mov $\leftarrow 1$
$temp2_{0:31} \leftarrow rA_{32:47} \times_{sf} rB_{32:47}$
    if $(rA_{32:47} = 0x8000)$ & $(rB_{32:47} = 0x8000)$ then
        $temp2_{0:31} \leftarrow 0x7FFF\_FFFF$ //saturate
        mov $\leftarrow 1$
$temp3_{0:31} \leftarrow rA_{48:63} \times_{sf} rB_{48:63}$
    if $(rA_{48:63} = 0x8000)$ & $(rB_{48:63} = 0x8000)$ then
        $temp3_{0:31} \leftarrow 0x7FFF\_FFFF$ //saturate
        mov $\leftarrow 1$
$temp0_{0:31}$, ov $\leftarrow ((((temp0_{0:31} +_{SAT} temp1_{0:31}) +_{SAT} temp2_{0:31}) +_{SAT} temp3_{0:31})$
        $rD_{0:31} \leftarrow temp_{0:31}$
        // update accumulator
        if A = 1 then $ACC_{0:31} \leftarrow rD_{0:31}$
        // update SPEFSCR
        $SPEFSCR_{OVH} \leftarrow$ mov | ov; $SPEFSCR_{OV} \leftarrow 0$
        $SPEFSCR_{SOVH} \leftarrow SPEFSCR_{SOVH}$ | mov | ov

---

Figure 3:
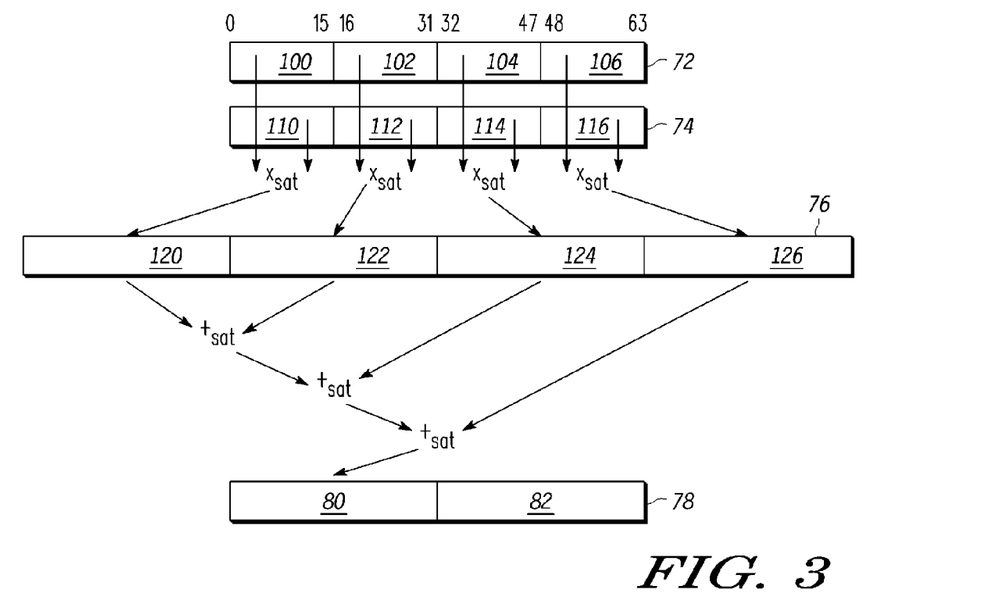
FIG. 3 shows generation of a bit exact result corresponding to a vector dot product operation, consistent with one embodiment of the invention.

As shown in the pseudo-code above, temp0, temp1, temp2, and temp3 may reflect signed/fractional multiplication results (intermediate products) of each of the four packed data elements (e.g., half-words). In the example shown if both inputs of a multiply are −1.0, then the result is saturated to 0x7FFF_FFFF. In case of an overflow, MOV flag 35 (multiply overflow bit or flag) may be set to 1 (MOV flag 35 may be stored as part of status registers (e.g., register SPEFSCR referred in the above pseudo-code example). All four multiplication operations, saturation operations, and the setting of MOV flag may be done in parallel. Thus, by way of example, as shown in FIG. 3, a first input having four packed data elements 100, 102, 104, and 106 may be stored in a register 72. A second input having four packed data elements 110, 112, 114, and 116 may be stored in register 74. A first packed data element 100 corresponding to the first input stored in register 72 and a first packed data element 110 corresponding to the second input stored in register 74 may be multiplied and an intermediate product 120 may be stored in a portion (e.g., a 32 bit portion) corresponding to register 76 (for sake of convenience, $^\times$sat is used in FIG. 1 and other figures to indicate a multiplication operation, where the result may be saturated, if necessary and $^+$sat is used in FIG. 1 and other figures to indicate a summation operation, where the result may be saturated, if necessary). Intermediate product 120 may be selectively saturated. By way of example, each of first packed data element 100 and first packed data element 110 may be compared to a constant to determine whether intermediate product needs to be saturated. If both first packed data element 100 and first packed data element 110 match the constant then the intermediate product may be saturated. Similarly, the remaining three packed data elements of each input may also be multiplied and the intermediate results stored in the remaining three 32 bit portions (122, 124, and 126) of register 76. The intermediate 32-bit products may be added together, left to right, to produce a 32 bit result, saturating each intermediate sum, if an overflow or underflow occurs. Thus, for example, intermediate product 120 and 122 may be added, saturating the sum if an overflow or underflow occurs. Next, intermediate product 124 may be added to the sum of intermediate products 120 and 122, saturating the sum if an overflow or an underflow occurs. Next, intermediate product 126 may be added to the previously obtained sum, saturating the sum if an overflow or an underflow occurs. Final vector dot product result may be placed in a portion 80 of destination register 78. Another portion 82 of destination register 78 may be unaffected. Overflow and underflow bits may be recorded in a register based on an overflow or underflow from either the multiplication or the summation operation. Overflow or underflow bit may indicate when a result of the multiplication or the summation operation was saturated. Although FIG. 3 shows four packed data elements being processed, fewer or more packed data elements may be processed. Also, once the intermediate products are generated an operation to be performed on the intermediate products may be selected and then the selected operation may be performed on the intermediate products.

EXAMPLE 2

Figure 4:
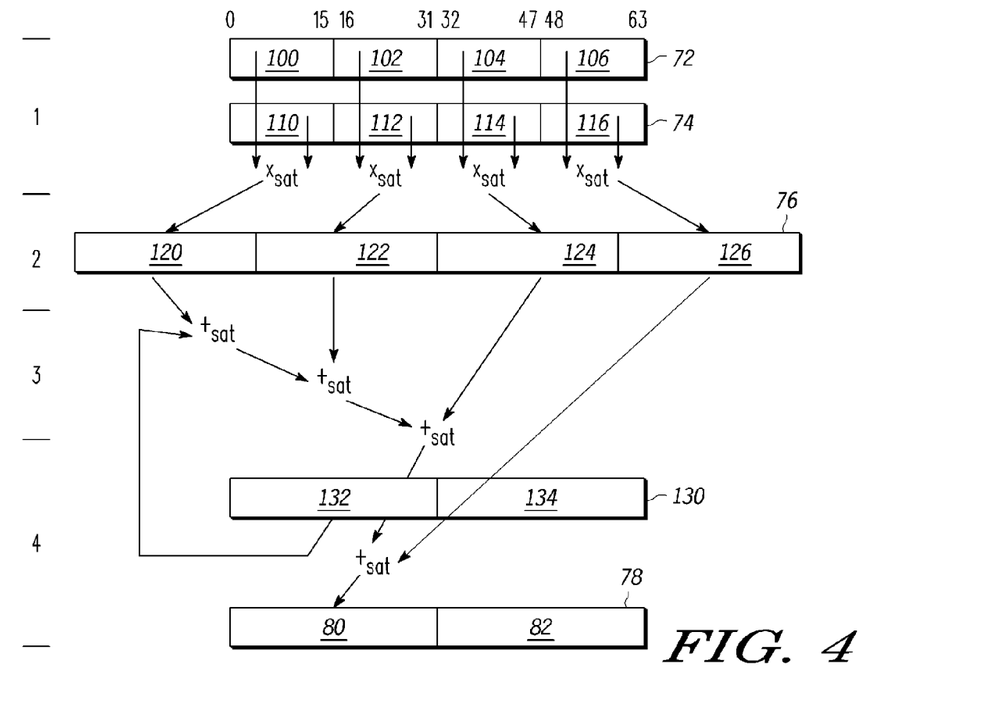
FIG. 4 shows generation of a bit exact result corresponding to a vector dot product operation, consistent with one embodiment of the invention.

By way of another example, a vector dot product of more than four packed data elements (signed or unsigned, fractional or integer) may be generated by using accumulator 32 of FIG. 1. In this example, a portion of the result may be accumulated in accumulator 32. The second example may be useful in a situation where more packed data elements than can be stored in a register at a time may need to be processed, for example in generating a finite impulse response using samples stored as a first data input and coefficients stored as a second data input. In particular, as shown in FIG. 4, the result may be stored into an upper word portion (e.g., 132 of accumulator 130) using an exemplary instruction. The following exemplary pseudo-code may be used to generate the vector dot product in a bit exact manner, where, rD is a destination register, rA is one of the general registers containing one input, and rB is another one of the general registers containing a second input:

$$
\begin{aligned}
&temp0_{0:31} \leftarrow rA_{0:15} \times_{sf} rB_{0:15} \\
&\quad \text{if } (rA_{0:15} = 0x8000) \,\&\, (rB_{0:15} = 0x8000) \text{ then} \\
&\qquad temp0_{0:31} \leftarrow 0x7FFF\_FFFF \text{ //saturate} \\
&\qquad mov \leftarrow 1 \\
&\quad \text{else} \\
&\qquad mov \leftarrow 0 \\
&temp1_{0:31} \leftarrow rA_{16:31} \times_{sf} rB_{16:31} \\
&\quad \text{if } (rA_{16:31} = 0x8000) \,\&\, (rB_{16:31} = 0x8000) \text{ then} \\
&\qquad temp1_{0:31} \leftarrow 0x7FFF\_FFFF \text{ //saturate} \\
&\qquad mov \leftarrow 1 \\
&temp2_{0:31} \leftarrow rA_{32:47} \times_{sf} rB_{32:47} \\
&\quad \text{if } (rA_{32:47} = 0x8000) \,\&\, (rB_{32:47} = 0x8000) \text{ then} \\
&\qquad temp2_{0:31} \leftarrow 0x7FFF\_FFFF \text{ //saturate} \\
&\qquad mov \leftarrow 1 \\
&temp3_{0:31} \leftarrow rA_{48:63} \times_{sf} rB_{48:63} \\
&\quad \text{if } (rA_{48:63} = 0x8000) \,\&\, (rB_{48:63} = 0x8000) \text{ then} \\
&\qquad temp3_{0:31} \leftarrow 0x7FFF\_FFFF \text{ //saturate} \\
&\qquad mov \leftarrow 1 \\
&temp_{0:31}, ov \leftarrow ((((temp0_{0:31} +_{SAT} ACC_{0:31}) +_{SAT} temp1_{0:31}) +_{SAT} temp2_{0:31}) +_{SAT} \\
&temp3_{0:31}) \\
&\qquad rD_{0:31} \leftarrow temp_{0:31}) \\
&\quad \text{// update accumulator} \\
&\qquad ACC_{0:31} \leftarrow rD_{0:31} \\
&\quad \text{// update SPEFSCR} \\
&\qquad SPEFSCR_{OVH} \leftarrow mov \mid ov; SPEFSCR_{OV} \leftarrow 0 \\
&\qquad SPEFSCR_{SOVH} \leftarrow SPEFSCR_{SOVH} \mid mov \mid ov
\end{aligned}
$$

Similar to as explained above with respect to Example 1 above and as shown above, temp0, temp 1, temp2, and temp3 may reflect signed/fractional multiplication results (intermediate products) of each of the four packed data elements (e.g., half-words). In this second example, intermediate products 120, 122, 124, and 126 may be generated in a similar manner, as described above with respect to Example 1. The first four packed data elements may be processed in a manner similar to Example 1. An intermediate product of a fifth packed data element of the first data input (fifth packed data element may be stored in the same portion of register 72 as first packed data element 100) and a fifth packed data element of second data input (fifth packed data element may be stored in the same portion of register 74 as first packed data element 110) may be summed with a value stored in a portion 132 of accumulator 130, saturating the sum if an overflow or an underflow occurs. Next, intermediate product 122 may be added to the sum of intermediate products 120 and accumulated value stored in portion 132 of accumulator 130, saturating the sum if an overflow or an underflow occurs. Next, intermediate product 124 may be added to the previously obtained sum, saturating the sum if an overflow or an underflow occurs. Next, intermediate product 126 may be added to the previously obtained sum, saturating the sum, if an overflow or an underflow occurs. Final vector dot product result may be placed in a portion 80 of destination register 78. Another portion 82 of destination register 78 may be unaffected. The instruction may specify which portion of accumulator is used to store the result. Thus, although FIG. 4 shows the bit exact result as being stored in an upper word portion (portion 80) of destination register 78, the bit exact result may also be stored in a lower word portion (portion 82) if so specified by the instruction.

Overflow and underflow bits may be recorded in a register based on an overflow or underflow from either the multiply or the summing operation. Example 2 may be accomplished by pipelining the execution of the various steps in stages 1, 2, 3, and 4, as shown in FIG. 4. Although FIG. 4 shows a particular implementation of generation of a bit exact vector dot product, other implementations may also be used to achieve the same result.

EXAMPLE 3

Figure 5:
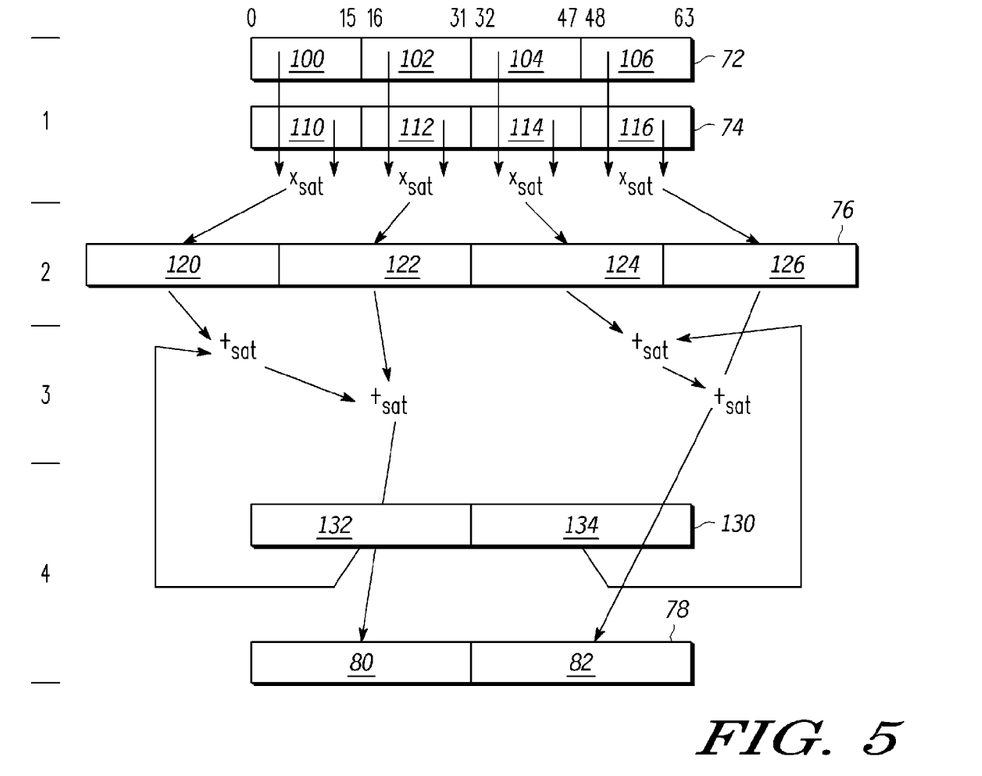
FIG. 5 shows generation of a bit exact result corresponding to a vector dot product operation, consistent with one embodiment of the invention.

By way of another example, a vector dot product of more than four packed data elements (signed or unsigned, fractional or integer) may be generated by using accumulator 32 of FIG. 1. In this example, portions of the result may be accumulated in accumulator 32. The third example may be useful in a situation where more packed data elements than can be stored in a register at a time may need to be processed, for example in generating a finite impulse response using samples stored as a first data input and coefficients stored as a second data input. In particular, as shown in FIG. 5, the result may be stored into both upper word and lower word portions (e.g., 132 and 134 of accumulator 130) using an exemplary instruction. The following exemplary pseudo-code may be used to generate the vector dot product in a bit exact manner, where, rD is a destination register, rA is one of the general registers containing one input, and rB is another one of the general registers containing a second input:

```
temp0_{0:31} ← rA_{0:15} ×_{sf} rB_{0:15}
if (rA_{0:15} = 0x8000) & (rB_{0:15} = 0x8000) then
    temp0_{0:31} ← 0x7FFF_FFFF //saturate
    movh ← 1
else
    movh ← 0
temp1_{0:31} ← rA_{16:31} ×_{sf} rB_{16:31}
if (rA_{16:31} = 0x8000) & (rB_{16:31} = 0x8000) then
    temp1_{0:31} ← 0x7FFF_FFFF //saturate
    movh ← 1
temp2_{0:31} ← rA_{32:47} ×_{sf} rB_{32:47}
if (rA_{32:47} = 0x8000) & (rB_{32:47} = 0x8000) then
    temp2_{0:31} ← 0x7FFF_FFFF //saturate
    movl ← 1
else
    movl ← 0
temp3_{0:31} ← rA_{48:63} ×_{sf} rB_{48:63}
if (rA_{48:63} = 0x8000) & (rB_{48:63} = 0x8000) then
    temp3_{0:31} ← 0x7FFF_FFFF //saturate
    movl ← 1
temph_{0:31}, ovh ← ((temp0_{0:31} +_{SAT} ACC_{0:31}) +_{SAT} temp1_{0:31})
templ_{0:31}, ovl ← ((temp2_{0:31} +_{SAT} ACC_{32:63}) +_{SAT} temp3_{0:31})
rD_{0:31} ← temph_{0:31}; rD_{32:63} ← templ_{0:31})
// update accumulator
ACC_{0:63} ← rD_{0:63}
// update SPEFSCR
SPEFSCR_{OVH} ← movh | ovh; SPEFSCR_{OV} ← movl | ovl
SPEFSCR_{SOVH} ← SPEFSCR_{SOVH} | movh | ovh; SPEFSCR_{SOV} ← SPEFSCR_{SOV} | movl | ovl
```

Similar to as explained above with respect to Example 1 and Example 2 above and as shown above, temp0, temp 1, temp2, and temp3 may reflect signed/fractional multiplication results (intermediate products) of each of the four packed data elements (e.g., half-words). Referring to FIG. 5, in this third example, intermediate products 120, 122, 124, and 126 may be generated in a similar manner, as described above with respect to Example 1. The first four packed data elements may be processed in a manner similar to Example 1. An intermediate product of a fifth packed data element of the first data input (fifth packed data element may be stored in the same portion of register 72 as first packed data element 100) and a fifth packed data element of second data input (fifth packed data element may be stored in the same portion of register 74 as first packed data element 110) may be summed with a value stored in a portion 132 (e.g., an upper word from left to right) of accumulator 130, saturating the sum if an overflow or an underflow occurs. Next, the previously obtained sum may be summed with intermediate product 122, saturating the sum if an overflow or an underflow occurs. Concurrently with the processing of the intermediated products 120 and 122, intermediate products 124 and 126 may also be processed, as shown in FIG. 5. In particular, by way of example, intermediate product 124 may be summed with a value stored in a portion 124 of accumulator 130, saturating the sum if an overflow or an underflow occurs. Next, the previously obtained sum may be summed with intermediate product 126, saturating the sum if an overflow or an underflow occurs. The generated bit exact result may be stored in portions 80 and 82 of destination register 78.

EXAMPLE 4

By way of another example, a vector sum of two or more packed data elements (signed or unsigned, fractional or integer) may be generated by using accumulator 32 of FIG. 1 using an exemplary instruction. The following exemplary pseudo-code may be used to generate the vector sum in a bit exact manner, where, rD is a destination register, rA is one of the general registers containing one input, and rB is another one of the general registers containing a second input:

```
temp_{0:31}, ovh ← ((rA_{0:31} +_{SAT} ACC_{0:31}) +_{SAT} rB_{0:31})
temp_{32:63}, ovl ← ((rA_{32:63} +_{SAT} ACC_{32:63}) +_{SAT} rB_{32:63})
rD_{0:63} ← temp_{0:63}
// update accumulator
ACC_{0:63} ← rD_{0:63}
// update SPEFSCR
SPEFSCR_{OVH} ← ovh; SPEFSCR_{OV} ← ovl
SPEFSCR_{SOVH} ← SPEFSCR_{SOVH} | ovh
SPEFSCR_{SOV} ← SPEFSCR_{SOV} | ovl
```

Figure 6:
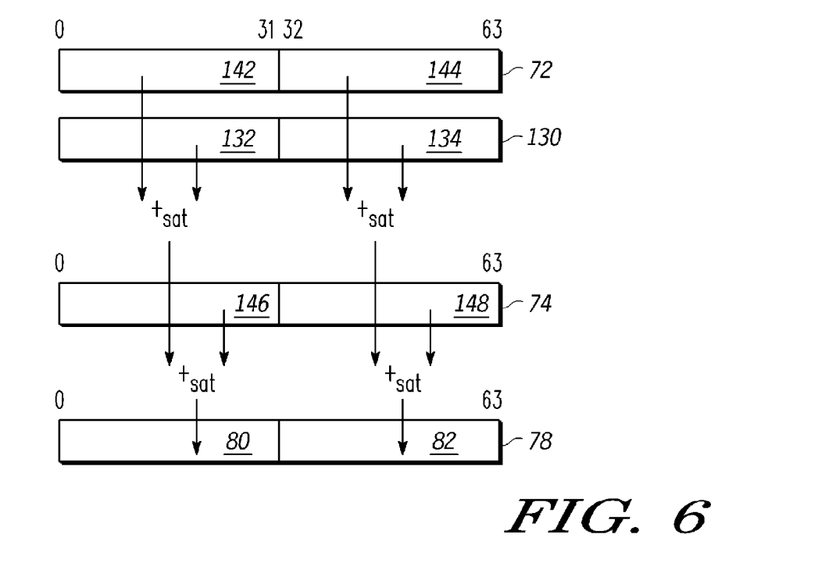
FIG. 6 shows generation of a bit exact result corresponding to a vector sum operation, consistent with one embodiment of the invention.

As part of example 4, corresponding packed data elements of a first input stored in register 72 may be added to corresponding packed data elements stored in accumulator 130, saturating if underflow or overflow occurs. Thus, referring now to FIG. 6, packed data element 142 may be summed with packed data element 132 and packed data element 144 may be summed with packed data element 134. Packed data element 146 of a second input stored in register 74 may be summed with the previously obtained sum of packed data element 142 and packed data element 132, saturating the sum if an overflow or an underflow occurs. Concurrently with this operation, packed data element 148 of the second input stored in register 74 may be summed with the previously obtained sum of packed data element 144 and packed data element 134. The bit exact result may then be stored in both portions 80 and 82 of destination register 78.

EXAMPLE 5

By way of another example, a vector sum across two or more packed data elements (signed or unsigned, fractional or integer) may be generated by using accumulator 32 of FIG. 1 using an exemplary instruction. The following exemplary pseudo-code may be used to generate the vector sum in a bit exact manner, where, rD is a destination register, rA is one of the general registers containing one input, and rB is another one of the general registers containing a second input:

```
temp_{0:31}, ovh ← (((rA_{0:31} +_{SAT} rA_{32:63}) +_{SAT} rB_{0:31}) +_{SAT} rB_{32:63})
rD_{0:31} ← temp_{0:31}
// update accumulator
ACC_{0:31} ← rD_{0:31}
// update SPEFSCR
SPEFSCR_{OVH} ← ovh; SPEFSCR_{OV} ← 0
SPEFSCR_{SOVH} ← SPEFSCR_{SOVH} | ovh
```

Figure 7:
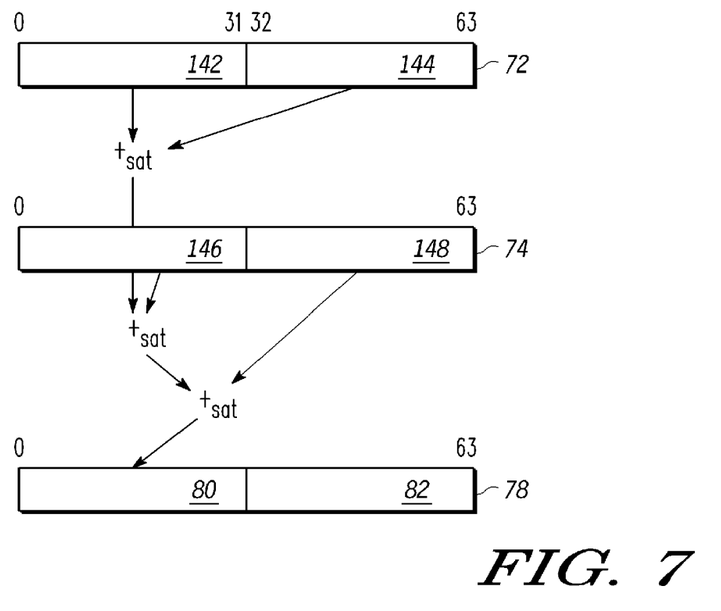
FIG. 7 shows generation of a bit exact result corresponding to a vector sum operation, consistent with one embodiment of the invention.

As part of example 5, packed data element 142 and packed data element 144 of a first input stored in register 72 may be summed, saturating the sum if an overflow or an underflow occurs. Next, packed data element 146 of a second input stored in register 74 may be summed with the previously obtained sum, saturating the sum if an overflow or an underflow occurs. Next, packed data element 148 of second input stored in register 74 may be summed with the previously obtained sum, saturating the sum if an overflow or an underflow occurs. The bit exact result may be stored in a portion 80 of destination register 78. The instruction may specify which portion of destination register is used to store the result. Thus, although FIG. 7 shows the bit exact result as being stored in an upper word portion (portion 80) of destination register 78, the bit exact result may also be stored in a lower word portion (portion 82) if so specified by the instruction.

EXAMPLE 6

By way of another example, a vector sum across two or more packed data elements (signed or unsigned, fractional or integer) may be generated by using accumulator 32 of FIG. 1 using an exemplary instruction. The following exemplary pseudo-code may be used to generate the vector sum in a bit exact manner, where, rD is a destination register, rA is one of the general registers containing one input, and rB is another one of the general registers containing a second input:

```
temp_{0:31}, ov ← ((((rA_{0:31} +_{SAT} ACC_{0:31}) +_{SAT} rA_{32:63}) +_{SAT} rB_{0:31}) +_{SAT} rB_{32:63})
rD_{32:63} ← temp_{0:31}
// update accumulator
ACC_{0:31} ← rD_{32:63}
// update SPEFSCR
SPEFSCR_{OVH} ← ovh; SPEFSCR_{OV} ← 0
SPEFSCR_{SOVH} ← SPEFSCR_{SOVH} | ovh
```

Figure 8:
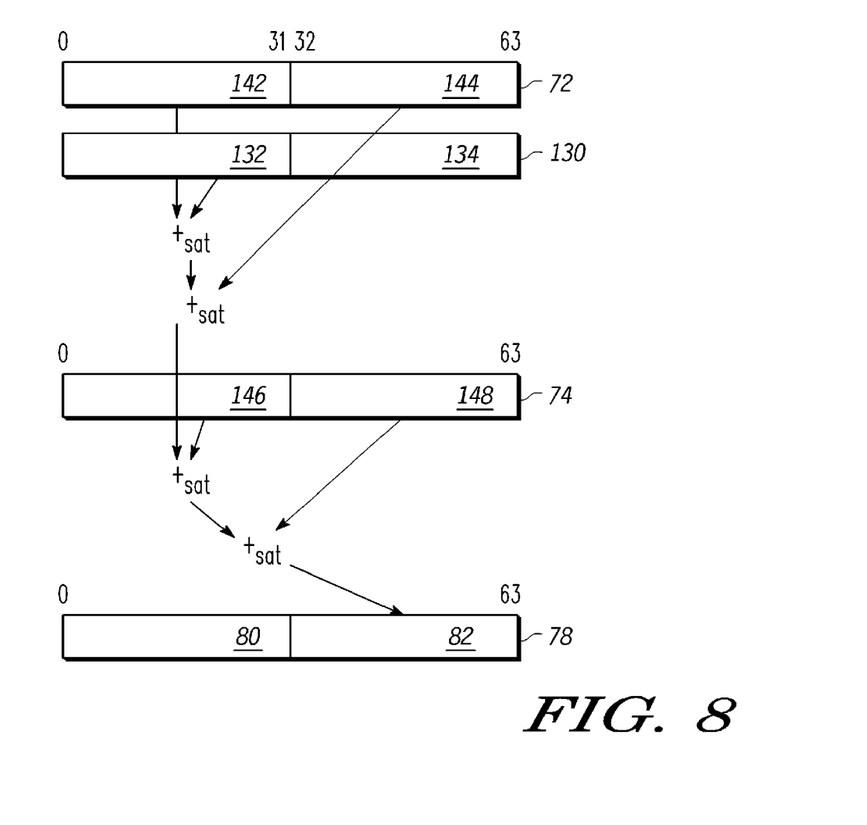
FIG. 8 shows generation of a bit exact result corresponding to a vector sum operation, consistent with one embodiment of the invention.

As part of example 6, as shown in the exemplary pseudo-code and with reference to FIG. 8, packed data element 142 of a first input stored in register 72 may be summed with packed data element 132 stored in accumulator 130, saturating the sum if an overflow or an underflow occurs. Next, packed data element 144 of the first input stored in register 72 is summed with the previously obtained sum, saturating the sum if an overflow or an underflow occurs. Next, packed data element 146 of a second input stored in register 74 may be summed with the previously obtained sum, saturating the sum if an overflow or an underflow occurs. Next, packed data element 148 of the second input stored in register 74 may be summed with the previously obtained sum, saturating the sum if an overflow or an underflow occurs. The generated bit exact result may then be stored in portion 82 of final destination register 78. The instruction may specify which portion of destination register is used to store the result. Thus, although FIG. 8 shows the bit exact result as being stored in a lower word portion (portion 82) of destination register 78, the bit exact result may also be stored in an upper word portion (portion 80) if so specified by the instruction.

Additionally, a vector sum across operation may include retrieving a first portion (e.g., first packed data element) of a first vector, a second portion of the first vector, a third portion of the first vector, and a fourth portion of the first vector. The first portion of the first vector and the second portion of the first vector may be added to produce a first intermediate result, which may be saturated if necessary. Next, the third portion of the first vector may be added to the first intermediate result to generate a second intermediate result, which may be saturated if necessary. Next, the fourth portion of the first vector may be added to the second intermediate result to produce a third intermediate result, which may be saturated if necessary. The third intermediate result may be the final bit exact result.

In the foregoing specification, the invention has been described with reference to specific embodiments. However, one of ordinary skill in the art appreciates that various modifications and changes can be made without departing from the scope of the present invention as set forth in the claims below. For example, although most of the examples given above show saturation after summation operation and summation after multiplication operation, the results of these operations need not be saturated. Additionally and/or alternatively, based on an instruction a subset of the results of these operations may be saturated. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system, comprising:
   means for storing a first portion of an instruction, wherein the first portion of the instruction selects a vector operation;
   means for storing a second portion of the instruction, wherein the second portion of the instruction selects operand width used in the vector operation;
   means for storing a third portion of the instruction, wherein the third portion of the instruction selects one of an addition operation and a subtraction operation to be used in the vector operation;
   means for storing a fourth portion of the instruction, wherein the fourth portion of the instruction selects signed or unsigned for the vector operation;
   means for storing a fifth portion of the instruction, wherein the fifth portion of the instruction selects saturated or unsaturated for the vector operation;
   means for storing a sixth portion of the instruction, wherein the sixth portion of the instruction selects fractional or integer for the vector operation;
   means for storing a seventh portion of the instruction, wherein the seventh portion of the instruction selects one or more of an upper portion of a destination register and a lower portion of the destination register for storing a bit exact result of the vector operation;

means for storing a eighth portion of the instruction, wherein the eighth portion of the instruction selects a width of the bit exact result of the vector operation; and means for storing a ninth portion of the instruction, wherein the ninth portion of the instruction selects a whether the bit exact result is stored in an accumulator as well as in the destination register.

2. A data processing system as in claim 1, wherein if the ninth portion of the instruction selects that the bit exact result is to be stored in an accumulator as well as in the destination register, then the seventh portion of the instruction also selects one or more of an upper portion of the accumulator and a lower portion of the accumulator for storing the bit exact result of the vector operation.

3. A method for operating a data processing system, comprising:

executing a single instruction to perform a vector dot product, wherein executing the single instruction to perform the vector dot product comprises:

retrieving a first portion of a first vector, a second portion of the first vector, and a third portion of the first vector from a first register;

retrieving a first portion of a second vector, a second portion of the second vector, and a third portion of the second vector from a second register;

multiplying the first portion of the first vector and the first portion of the second vector to produce a first intermediate product;

multiplying the second portion of the first vector and the second portion of the second vector to produce a second intermediate product;

multiplying the third portion of the first vector and the third portion of the second vector to produce a third intermediate product;

selecting an operation to perform;

prior to performing the operation using the first intermediate product, the second intermediate product, and the third intermediate product to produce a result, wherein the result is a bit exact result, saturating the first intermediate product, if the first intermediate product overflowed or underflowed, concurrently saturating the second intermediate product, if the second intermediate product overflowed or underflowed and concurrently saturating the third intermediate product, if the third intermediate product overflowed or underflowed.

\* \* \* \* \*